(No Model.)
D. C. OTIS.
Filter.
No. 229,744. Patented July 6, 1880.
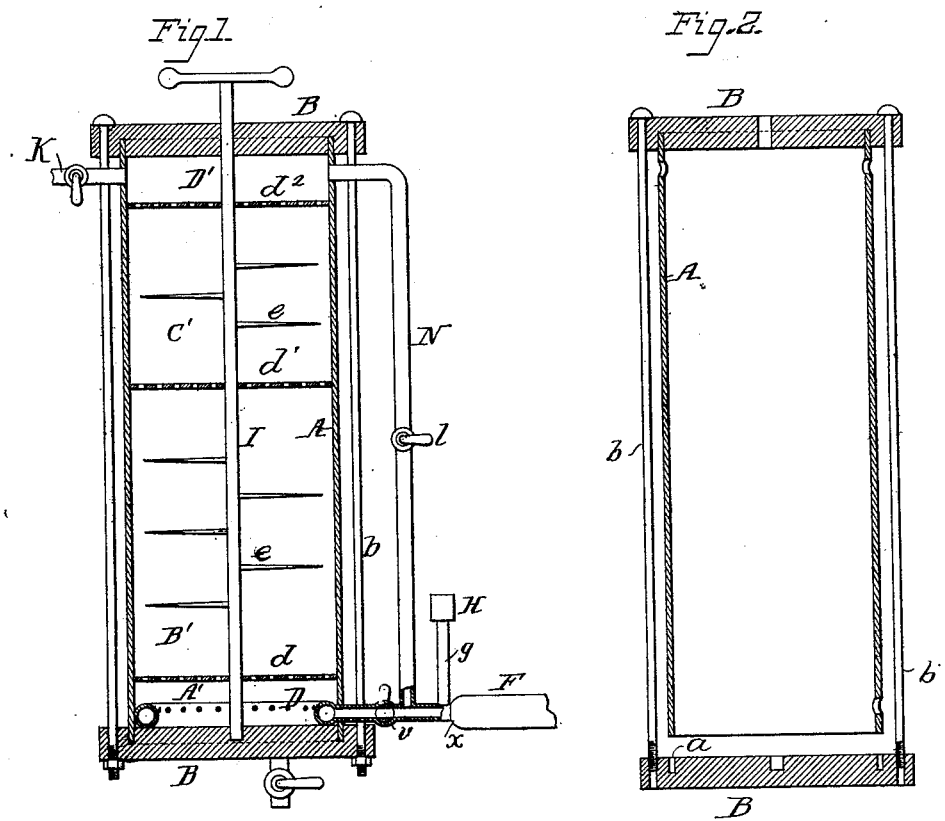
Attest:
Courtney A Cooper
William Paxton
D. C. Otis
By his attorney
Charles E. Foster
N. PETERS, PHOTO-LITHOGRAPHER, WASHINGTON, D. C.

UNITED STATES PATENT OFFICE.

DANIEL C. OTIS, OF NEW YORK, N. Y.

FILTER.

SPECIFICATION forming part of Letters Patent No. 229,744, dated July 6, 1880.

Application filed April 15, 1880. (No model.)

*To all whom it may concern:*

Be it known that I, DANIEL C. OTIS, of the city, county, and State of New York, have invented an Improved Filtering Apparatus, of which the following is a specification.

The objects of my invention are to facilitate the filtering of liquids of various kinds, especially of water, preserve the purity of the latter, and improve and cheapen the filtering apparatus; and these I effect by providing means for agitating the filtering material, and by the construction and filtering material, hereinafter set forth.

In the drawings, forming part of this specification, Figure 1 is a sectional elevation of an apparatus illustrating my invention; Fig. 2, a section, showing the mode of making the cylinder.

Ordinary apparatus used for filtering water, sirups, rectifying whisky, and refining coal-oil, &c., are open to the objection that no means exist for removing from the mass of pulverized filtering material the matter which lodges thereon during filtering operations. In many filters the current may be reversed, and will thus carry out a part of the sedimentary matter; but this is only partial in effect, and in a little while the material must be removed, cleared, and replaced.

I remedy this difficulty by combining with the apparatus suitable devices whereby, during the flow of the liquid, the filtering material may be agitated and the particles moved one upon the other, so as to close the water-courses formed while filtering, and facilitate the escape, for the time, of the matter lodged between the particles, the said matter being carried with the current either direct or reversed.

I do not limit myself to any special means of effecting this agitation or movement of the material, as various appliances may be used; but I have shown in the drawings devices which are effective.

The body or cylinder A is a metallic tube of suitable diameter, and I make the heads of wood, each head being a cylindrical block, B, with an annular groove, $a$, to receive the end of the tube, and perforated for the passage of tie-bolts $b$, which correspond to the heads of the tube. The moisture, by causing the wood to swell, insures tight joints between the heads and tube without the use of packing or grooved faces, necessary when metal is used.

The inlet-pipe F communicates with an annular perforated distributer, D, by which the liquid is sprayed into the filter.

The interior of the tube may be divided, by perforated partitions $d\ d'\ d^2$, into chambers A' B' C' D', the chamber A' being filled with charcoal and the chamber B' with mixed sand and gravel, pulverized ore, or any other suitable material, magnetic iron ore being preferable.

Through the head of the cylinder extends a shaft, I, provided at the upper end with any suitable means for turning it, and from the shafts extend blades $e$, of such a shape that they will readily pass between the particles of material as the shaft is turned.

During the ordinary filtering operations the liquid enters by the inlet F, passes through the filtering material, and out through the pipe K, eventually forming water-courses which interfere with the filters; but when the filter becomes clogged the shaft I is turned, when the particles of charcoal or ore, &c., are separated and moved upon each other in such manner as to break up the water-courses and facilitate the escape of the sediment, which is carried with the current and expelled.

Usually it is best to reverse the current for this purpose. I therefore provide the filter with a reversing-pipe, N, leading from the pipe F to the other end of the filter, provided with a cock, $l$, a cock, $v$, being placed in the pipe F between the pipe N and the cylinder.

The pipe F is enlarged abruptly at $x$, and a pipe, $g$, provided with a check-valve, H, communicates with the pipe F at this point, and serves to admit air when the passage of the fluid under pressure tends to create a vacuum, thereby aerating the water.

All natural fresh waters contain in suspension about fifteen cubic inches of air to the imperial gallon. When this water is stored in reservoirs, cisterns, &c., a portion of this air is evaporated. The purity of the water is thereby deteriorated, and as evaporation proceeds animalcules are generated. The introduction of fresh air aerates the water and restores it to its natural purity. The introduction of iron ore in connection with the air forms an oxide, that tends to kill the animalcules. Any other suitable appliances may be used to aerate the water.

I claim—

1. In a filter, the combination of a casing containing filtering material, an agitating device, inlet, outlet, and discharge pipes, and a circulating-pipe arranged to permit the current to be reversed during the agitation of the material, substantially as set forth.

2. The combination of the cylinder A, inlet-pipe F, circulating-pipe N, and inlet-valve H, substantially as specified.

3. A filter for filtering water passing through the same under pressure, provided with an air-inlet valve arranged to permit air to pass automatically to the inflowing fluid, substantially as set forth.

In testimony whereof I have signed my name to this specification in the presence of two subscribing witnesses.

DANIEL C. OTIS.

Witnesses:
JOHN McMAHON,
WM. FRANK HALL.